United States Patent
Jeong (10) Patent No.: US 7,623,570 B2
(45) Date of Patent: Nov. 24, 2009

(54) MULTI SUB-CARRIER COMMUNICATION SYSTEM AND METHOD PROVIDING IMPROVED FREQUENCY EQUALIZATION PERFORMANCE

(75) Inventor: Jun-Young Jeong, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 623 days.

(21) Appl. No.: 11/283,027

(22) Filed: Nov. 18, 2005

(65) Prior Publication Data
US 2006/0140295 A1 Jun. 29, 2006

(30) Foreign Application Priority Data
Dec. 29, 2004 (KR) .................. 10-2004-0115409

(51) Int. Cl.
*H03H 7/30* (2006.01)
(52) U.S. Cl. .................. 375/229; 375/232; 375/233; 375/234; 375/240.29; 375/261; 370/206; 370/207; 370/208; 329/324; 332/103
(58) Field of Classification Search .................. 375/229, 375/232, 240.29; 370/210
See application file for complete search history.

(56) References Cited
U.S. PATENT DOCUMENTS
5,790,516 A * 8/1998 Gudmundson et al. ...... 370/210

7,406,125 B2 * 7/2008 Morejon et al. ........ 375/240.29
2002/0012392 A1 * 1/2002 Goldston et al. ............ 375/232
2003/0007554 A1 1/2003 Birru .......................... 375/233
2005/0053128 A1 * 3/2005 Shearer et al. .............. 375/232

FOREIGN PATENT DOCUMENTS

| EP | 0 967 763 A1 | 12/1999 |
| JP | 10-209931 | 8/1998 |
| JP | 2002-290294 | 10/2002 |
| KR | 1020010083264 A | 9/2001 |

* cited by examiner

*Primary Examiner*—Mohammad H Ghayour
*Assistant Examiner*—Adolf Dsouza
(74) *Attorney, Agent, or Firm*—F. Chau & Associates, LLC (57) ABSTRACT

There is provided a multi sub-carrier communication system for providing improved performance of a frequency equalizer and a method thereof. The multi sub-carrier communication system includes a frequency equalization coefficient (vector) calculation unit that receives an equalized signal outputted from a frequency equalizer and periodically calculates a new frequency equalizer coefficient (vector) which is used to update the frequency equalizer coefficient (vector) used by the frequency equalizer. The multi sub-carrier communication system periodically updates the frequency equalization coefficient (vector) (after an initialization interval for initially estimating a channel characteristic) by periodically calculating the frequency equalization coefficient (vector) during a data receiving interval and thus, it is possible to dynamically adapt to changes of the channel characteristic over the passage of time, thereby improving performance of the frequency equalizer. Accordingly, the performance of the multi sub-carrier communication system is enhanced.

13 Claims, 8 Drawing Sheets

MULTI SUB-CARRIER COMMUNICATION SYSTEM AND METHOD PROVIDING IMPROVED FREQUENCY EQUALIZATION PERFORMANCE

BACKGROUND OF THE INVENTION

1. Field of the Invention

The invention relates to a communication system, and more particularly, to a multi sub-carrier communication system for receiving and transmitting a signal encoded based on a quadrature amplitude modulation (QAM).

2. Description of the Related Art

Orthogonal Frequency Division Multiplexing (OFDM) systems use multiple sub-carrier frequencies (sub-channels) to transmit data.

In a multi sub-carrier communication system, a frequency equalizer (FEQ) is generally realized by calculating a channel distortion value H based on an average value of a predetermined number of received signals during estimating the channel and then taking an inverse value $H^{-1}$ of the calculated channel distortion value to determine equalization coefficients (an equalization vector) of a frequency equalizer. The performance level of the FEQ is dependent on the number of samples taken from the received signals.

Typical protocols of a wired multi- sub-carrier communication system perform a channel analysis within a limited time (during an initialization interval) to determine a FEQ coefficient (vector). Therefore, when there are many noises in a received signal, or when the number of received signals is small, the performance of the frequency equalizer may be degraded. Even if the performance of the frequency equalizer is optimized luckily by accurately estimating a channel characteristic, there still remains a chance that the performance of the frequency equalizer may be diminished by variations of the channel characteristics after a predetermined time has elapsed.

The channel characteristic of a wired channel such as a telephone line rarely changes within a short period of time but the channel characteristic may vary over a long period of time. Thus, it is necessary to repeatedly optimize the FEQ coefficient vector corresponding to the channel characteristic change. However, it is difficult to estimate an accurate channel characteristic for each time interval. In case where a high level of noise exists among received signals used for estimating the channel characteristic, or the number of samples is small, the performance of the frequency equalizer may be significantly degraded.

SUMMARY OF THE INVENTION

Embodiments of the invention are directed to a multi sub-carrier communication system and provide improved frequency equalization performance and a method thereof.

An aspect of the invention provides a multi sub-carrier communication system capable of determining (e.g., calculating) an optimum frequency equalization coefficient vector of a frequency equalizer.

Another aspect of the invention provides a method for setting an optimum frequency equalization coefficient vector of a frequency equalizer in a multi sub-carrier communication system.

Additional features of the invention will be apparent to those having ordinary skill in the art in the detailed description of exemplary embodiments which follows and which learned from practice of the disclosed invention. The features of the invention may be realized and attained by the exemplary structure particularly pointed out in the detailed description and the appended drawings and in other embodiments within the scope of the claims hereof.

According to an aspect of the invention, there is provided a method for calculating a frequency equalization coefficient vector of a frequency equalizer (e.g., used to correct for a channel distortion of a received signal with use of the frequency equalization coefficient vector), the method including the steps of: calculating an average value of N number of received signals outputted from the frequency equalizer; calculating a unit error correction vector which is a ratio of an expected value to the average value; and updating the frequency equalization coefficient vector of the frequency equalizer through multiplying a coefficients of a precedent frequency equalization coefficient vector with corresponding coefficients of the calculated unit error correction vector.

The received signal may be a signal encoded in a quadrature amplitude modulation (QAM) mode.

The method may further include the step of normalizing each of the received signals with a certain coordinate value to a reference coordinate value prior to the step of calculating the average value.

The expected value may be the reference coordinate value.

The method may further include the step of storing the received signals being normalized.

The step of calculating the average value may include the step of calculating an average value of the received signals being normalized when the number of the stored received signals is N, where N is a positive number.

The method may further include the step of compensating the calculated unit error correction vector according to a predetermined error compensation ratio.

The step of updating the frequency equalization coefficient vector may include the step of multiplying the coefficients of a precedent frequency equalization coefficient vector with the corresponding coefficients of a unit error correction vector when the unit error correction vector is not 1.

The aforementioned steps may be carried out periodically for a normal receiving mode.

The frequency equalization coefficient vector of the frequency equalizer may be set during an initialization interval of communications.

The received signal may include I number of sub-carriers, where I is a positive number.

The step of normalizing each of the received signals may include the steps of: detecting a sign of a real number and a sign of an imaginary number of the received signal; swapping the real number and the imaginary number for each other when the real number sign is different from the imaginary number sign; rotating a coordinate of the received signal to an axis where the real number equals to the imaginary number; and shifting the rotated coordinate of the received signal to the reference coordinate value.

According to another aspect of the invention, there is provided a method for calculating a frequency equalization coefficient vector of a frequency equalizer correcting a channel distortion of a received signal with use of the frequency equalization coefficient vector, the method including the steps of: receiving N number of received signals outputted from the frequency equalizer and each including I number of sub-carriers; calculating an average value of each I number of the sub-carriers; calculating a unit error correction vector each being a ratio of an expected value to each of the average values; and updating frequency equalization coefficients (of the frequency equalization coefficient vector) corresponding to each of the sub-carriers of the frequency equalizer based on values obtained by multiplying each coefficient of the unit error correction vector with each corresponding coefficient of a precedent frequency coefficient vector.

The received signals may be a signal encoded in a QAM mode.

The method may further include the step of normalizing the sub-carriers of the received signal with a certain coordinate value to a reference coordinate value prior to the step of calculating the average value.

The expected value may be the reference coordinate value.

The method may further include the step of storing the received signals being normalized.

The step of calculating the average value may include the step of calculating an average value of the sub-carriers of each normalized received signal when the number of the received signals being stored is N, where N is a positive number.

The method may further include the step of compensating the calculated unit error correction vectors according to a predetermined error compensation ratio.

According to a further another aspect of the invention, there is provided a multi sub-carrier communication system, including: a frequency equalizer for correcting a channel distortion of a received signal using a frequency equalization coefficient vector; and a calculation unit for calculating the frequency equalization coefficient vector, the calculation unit including: a first calculator for calculating an average value of N number of received signals from the frequency equalizer and calculating a unit error correction vector being a ratio of an expected value to the average value; and a second calculator for calculating (updating) the frequency equalization coefficient vector by using the unit error correction vector (e.g., by multiplying coefficients of a precedent frequency equalization coefficient vector with the corresponding coefficients of a unit error correction vector).

The received signal may be encoded in a QAM modulation.

The first calculator may include: a normalizer for normalizing each of the received signals outputted from the frequency equalizer to a reference coordinate value; a buffer for storing the received signals being normalized; and a unit error correction vector calculator for calculating an average value of N number of the received signals normalized and then stored into the buffer and calculating a unit error correction vector being a ratio of the expected value and the average value.

The expected value may be the reference coordinate value.

The second calculator may include: error compensator for compensating the calculated unit error correction vector according to a predetermined error compensation ratio; and a multiplier for multiplying coefficients of a precedent frequency equalization coefficient vector with the coefficients of the compensated unit error correction vector to calculate the (updated) frequency equalization coefficient vector.

Furthermore, the received signals may include I number of sub-carriers, where I is a positive number.

According to the invention, there is provided a multi sub-carrier communication system, including: a frequency equalizer for compensating a channel distortion of each received signal outputted from a Fourier transformer by using a frequency equalization coefficient vector; and a calculation unit for calculating the frequency equalization coefficient vector, the calculation unit including: a normalizer for normalizing each of the received signals from the frequency equalizer to a reference coordinate value; a buffer for storing the received signals being normalized; a unit error correction vector calculator for calculating an average value of N number of the received signals normalized and then stored into the buffer and calculating the unit error correction vector being a ratio of an expected value to the calculated average value; an error compensator for compensating the calculated unit error correction vector according to a predetermined compensation ratio; and a multiplier for calculating (updating) the frequency equalization coefficient by multiplying the coefficients of a precedent frequency equalization coefficient vector with the corresponding coefficients of the compensated unit error correction vector.

The frequency equalization coefficient vector of the frequency equalizer may be updated by operation of the multiplier.

The multi sub-carrier communication system may further include: an analog-digital converter for converting an analog signal inputted through a channel into a digital signal; a serial-parallel converter for converting a serial signal outputted from the analog-digital converter into a parallel signal; and a Fourier transformer for converting a signal within a time domain outputted from the serial-parallel converter into a signal within a frequency domain. At this time, each of the signals outputted from the Fourier transformer is provided as the received signal to the frequency equalizer.

It is to be understood that both the foregoing general description and the following detailed description of the invention are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this application, illustrate embodiment(s) of the invention and together with the description serve to explain the principle of the invention. Reference will be made in detail to the preferred embodiments of the invention, examples of which are illustrated in the accompanying drawings. However, the invention is not limited to the embodiments illustrated therein, and the embodiments illustrated therein are introduced to provide to persons skilled in the art an understanding of the principles and spirit of the invention. In the drawings.

DETAILED DESCRIPTION OF EXEMPLARY EMBODIMENTS OF THE INVENTION

Figure 1:
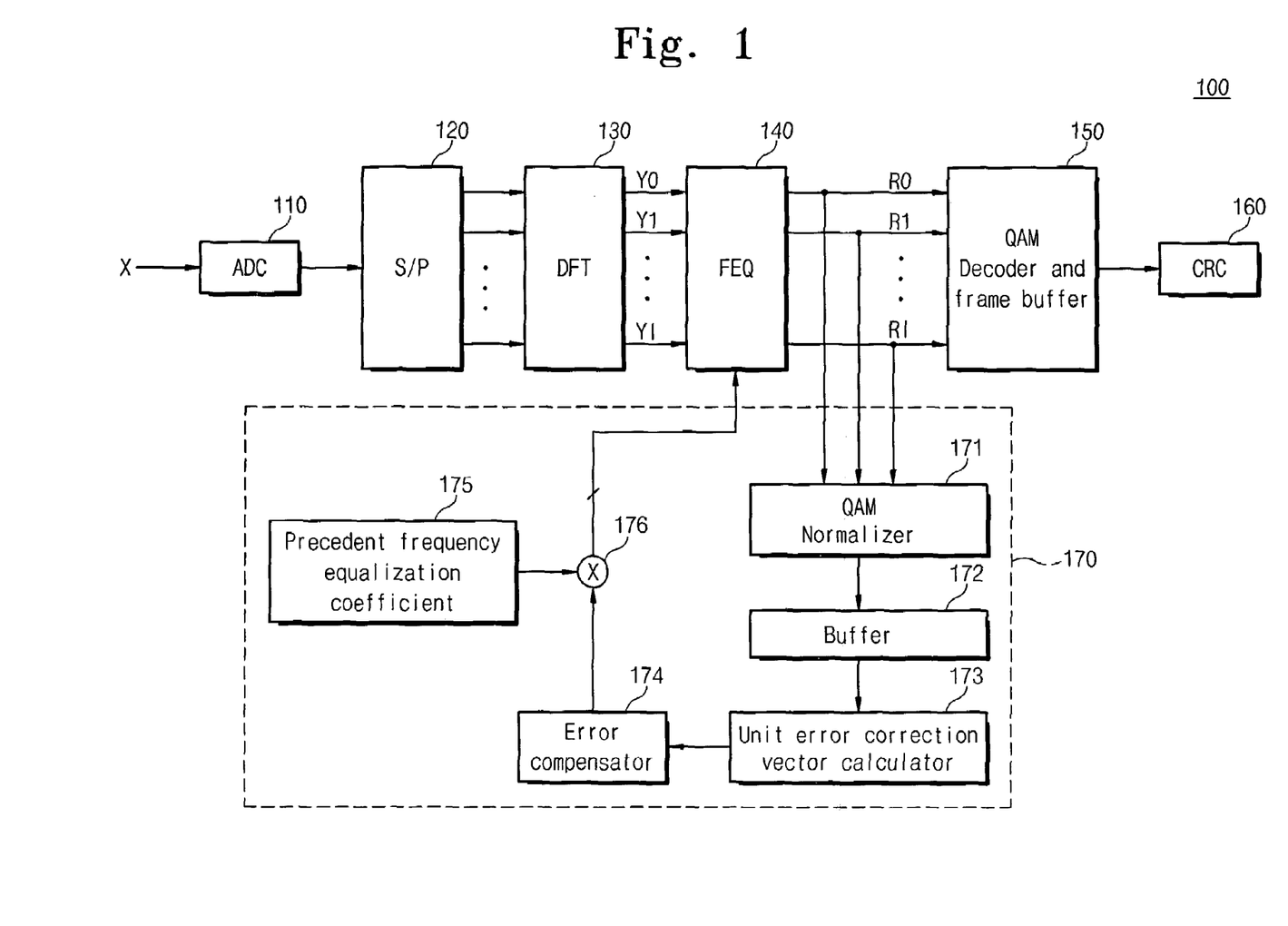
FIG. 1 is a block diagram illustrating a receiver in a multi sub-carrier communication system in accordance with a preferred embodiment of the invention.

FIG. 1 is a diagram illustrating a receiver of a multi sub-carrier communication system in accordance with a preferred embodiment of the invention.

As shown, a receiver 100 of a multi sub-carrier communication system includes: an analog-digital converter (ADC) 110; a serial-parallel converter (S/P) 120; a discrete Fourier transformer (DFT) 130; a frequency equalizer (FEQ) 140; a quadrature amplitude modulation (QAM) decoder and frame buffer 150; a cyclic redundancy checking (CRC) block 160; and a frequency equalization coefficient (vector) calculation unit 170.

An analog signal X received through a channel is converted into a digital signal by the analog-digital converter 110. The converted digital signal is a serial signal that is converted into a parallel signal by the serial-parallel converter 120. The parallel signal outputted from the serial-parallel converter 120 is a time domain (digital) signal. The discrete Fourier transformer 130 converts the parallel signal from the serial-parallel converter 120 into a frequency domain signal that represents the time domain (digital) signal. The frequency equalizer 140 corrects a channel distortion of the received signal from the discrete Fourier transformer 130 by using a frequency equalization coefficient vector. The channel distortion includes an amplitude (real) component and a phase shift (imaginary) component. The QAM decoder and frame buffer 150 decodes the signal outputted from the frequency equalizer 140 for restoring the outputted signal into an original signal and stores (buffers) and outputs the restored signal. The cyclic redundancy checking block 160 detects whether there is an error in the received signal.

The frequency equalization coefficient calculation unit 170 receives the signal from the frequency equalizer 140 and calculates a new frequency equalization coefficient vector to update the frequency equalization coefficient vector of the frequency equalizer 140. The frequency equalization coefficient calculation unit 170 includes: a QAM normalizer 171; a buffer 172; a unit error correction vector (UECV) calculator 173; an error compensator 174; a precedent coefficient buffer 175; and a multiplier 176. Detailed description of the operation of the frequency equalization coefficient calculation unit 170 will be provided below.

It should be noted that in the following description, the same reference numerals are user for the same elements among different drawings.

Figure 2:
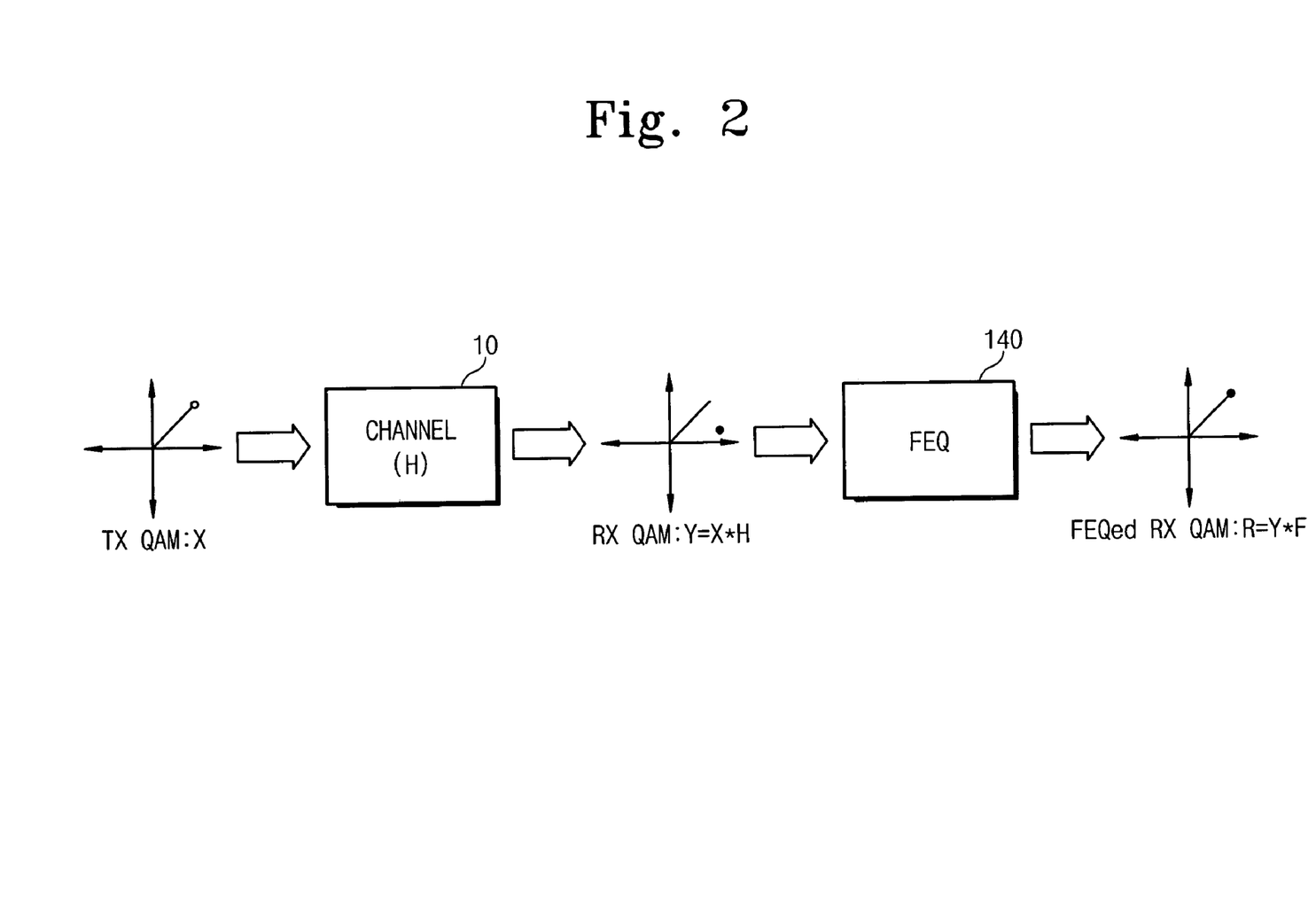
FIG. 2 is a conceptual diagram depicting a signal transmitted, received, and equalized, for describing the general operation of a frequency equalizer.

FIG. 2 is a conceptual diagram showing a transmitted, received and equalized signal for the describing general operation of a typical frequency equalizer.

The transmitted signal X is transmitted from a transmitter (not shown) of the communication system to the receiver 100 of the communication system through a channel 10. The received signal Y is a signal of which amplitude and phase have been shifted depending on a condition of the channel 10. Thus, the received signal Y is defined as the multiplication of the transmitted signal X and a channel characteristic H, i.e., $Y=X \cdot H$. It is advantageous to correct the channel characteristic H in the frequency domain, and thus the frequency equalizer 140 is generally employed to correct the channel characteristic H. For the correction of the channel characteristic H, it is necessary to accurately know about the transmitted signal X from the transmitter and to estimate a characteristic H of the channel 10. The frequency equalizer 140 corrects the channel characteristic H by multiplying the coefficients of the received signal Y with the corresponding coefficients of the frequency equalization coefficient vector F. The frequency equalization coefficient vector F can be expressed as the inverse of the channel characteristic H. Thus, $X=Y \cdot F$ To obtain an optimum value of the frequency equalization coefficient vector F, the channel characteristic H should be estimated accurately, and the accurate estimation of the channel characteristic H is achieved by minimizing a noise effect of the channel 10. Since an average value of noise over an infinite time is approximately 0, the noise effect can be eliminated by calculating an average value of signals received for an infinite time. However, there is a practical time limitation, for the estimation of the channel characteristic H, since the interval in which a particular signal is transmitted and received is limited. If noise of the received signal within a calibrated time interval is irregular, the average value of the noise does not reach the value of 0 and as a result, the channel characteristic H estimated based on the addition of the received signals is inaccurate.

FIGS. 3A to 3D are graphs depicting exemplary channel estimation errors. In FIGS. 3A to 3D, white dots represent received signals, while black dots represent the average value of the received signals.

Figure 3A:
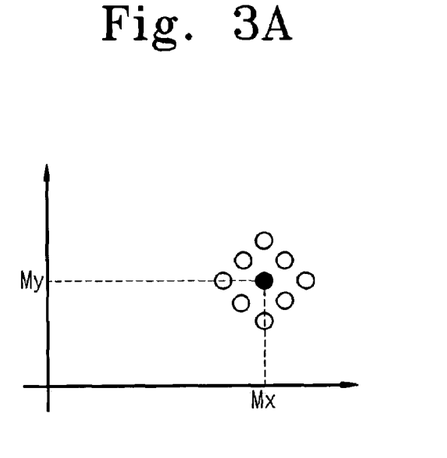
FIGS. 3A to 3D are graphs depicting exemplary channel estimation errors.
Figure 3B:
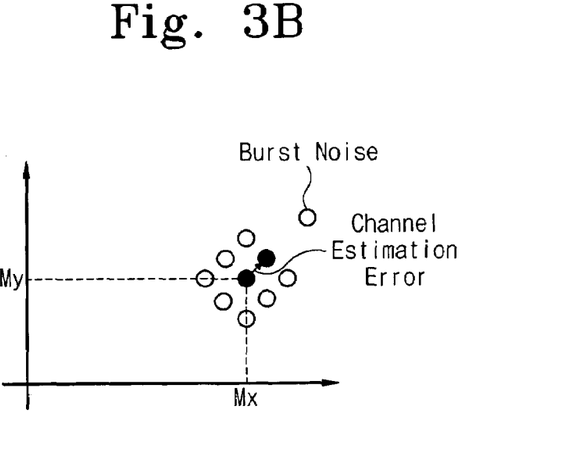
Figure 3C:
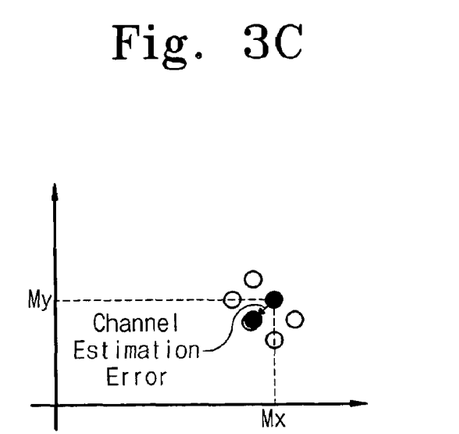
Figure 3D:
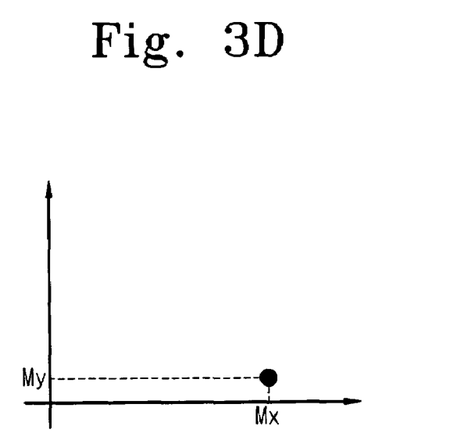

FIG. 3A shows the case of an accurate estimation of the channel characteristic since the average of noise of the channel is close to a value of approximately 0. FIG. 3B shows the case that a sample signal having noise of which amplitude is instantaneously high is included among received signals. FIG. 3C shows the case that a noise distribution is skewed to a particular direction at an interval for calculating a channel value. The skewed noise distribution shown in FIG. 3C may appear when the channel estimation interval is short. Thus, for the accurate estimation of the channel characteristic, a larger number of received signals are sampled as the amplitude of the noise of the channel becomes higher. FIG. 3D shows the case that an output value of the discrete Fourier transformer 130 is deflected to a real number part because of a phase distortion. The deflection phenomenon shown in FIG. 3D can arise when an effective number of imaginary numbers is less than the amplitude of the noise.

Therefore, the receiver 100 of the multi sub-carrier communication system in accordance with the preferred embodiment of the invention updates an initialization interval estimate of the channel characteristic H and the frequency equalization coefficient vector F periodically during a data receiving interval. This updated activity results in an improvement in the performance of the frequency equalizer 140 since the receiver 100 of the multi sub-carrier communication system dynamically handles changes of the channel characteristic according to the passage of time. Hence, the performance of the multi sub-carrier communication system is improved.

Figure 4:
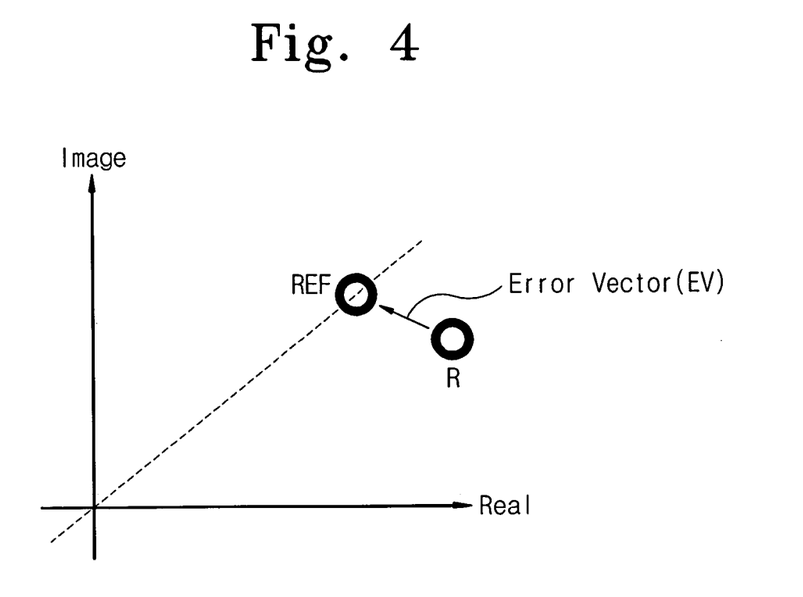
FIG. 4 is a graph depicting an error between a received signal outputted from a frequency equalizer and a reference signal.

FIG. 4 is a graph showing an error between a frequency equalized received signal R outputted from the frequency equalizer 140 and a reference signal REF. The frequency equalized received signal R outputted from the frequency equalizer 140 is a signal for which the channel characteristic H is corrected by performing the frequency equalization. However, when the channel characteristic H cannot be accurately estimated due to noise of the channel, there are errors included in frequency equalized received signals. Thus, there is difference between the reference signal REF and the frequency equalized received signal R. An error vector EV expresses the above mentioned difference between the reference signal REF and the frequency equalized received signal R. If the frequency equalizer 140 has an optimum performance level, the frequency equalized received signal R becomes equal to the reference signal REF, and the error vector EV becomes 0. Hence, the frequency equalization coefficient calculation unit 170 according to the preferred embodiment of the invention uses a unit error correction vector U to make the error vector EV become 0. The unit error correction vector U is defined by the following equations 1, 2 and 3:

$$Ri = Hi \cdot Xi \cdot F(i, n) \qquad \text{Eq. 1}$$

$$Ravg(i, n) = \frac{1}{n}\sum_{k=1}^{M} R(i, k) \qquad \text{Eq. 2}$$

$$U(i, n) = \frac{REF}{Ravg(i, n)} \qquad \text{Eq. 3}$$

Herein, the frequency equalized received signal R includes I number of sub-carriers (R1, R2, ..., RI), and Ri is an ith sub-carrier outputted from the frequency equalizer 140. Thus, i=1, 2, 3, ... I. Also, Hi and Xi are channel response values of the ith sub-carrier and a transmitted signal from the transmitter, respectively. F(i,n) is a frequency equalization coefficient that is obtained at an $n^{th}$ repeat of the $i^{th}$ sub-carrier. Further, N is the number of frames used for calculating an average value from the received signals.

The unit error correction vector (U) is used to update the frequency equalization coefficient vector and is defined as follows.

$$F(i,n)=F(i,n-1) \cdot U(i,n-1) \qquad \text{Eq. 4}$$

The frequency equalization coefficient calculation unit 170 performs operations of the above equations 1 to 4. Operation of the frequency equalization coefficient calculation unit 170 will be described in detail with reference to FIGS. 1 to 9.

Figure 9:
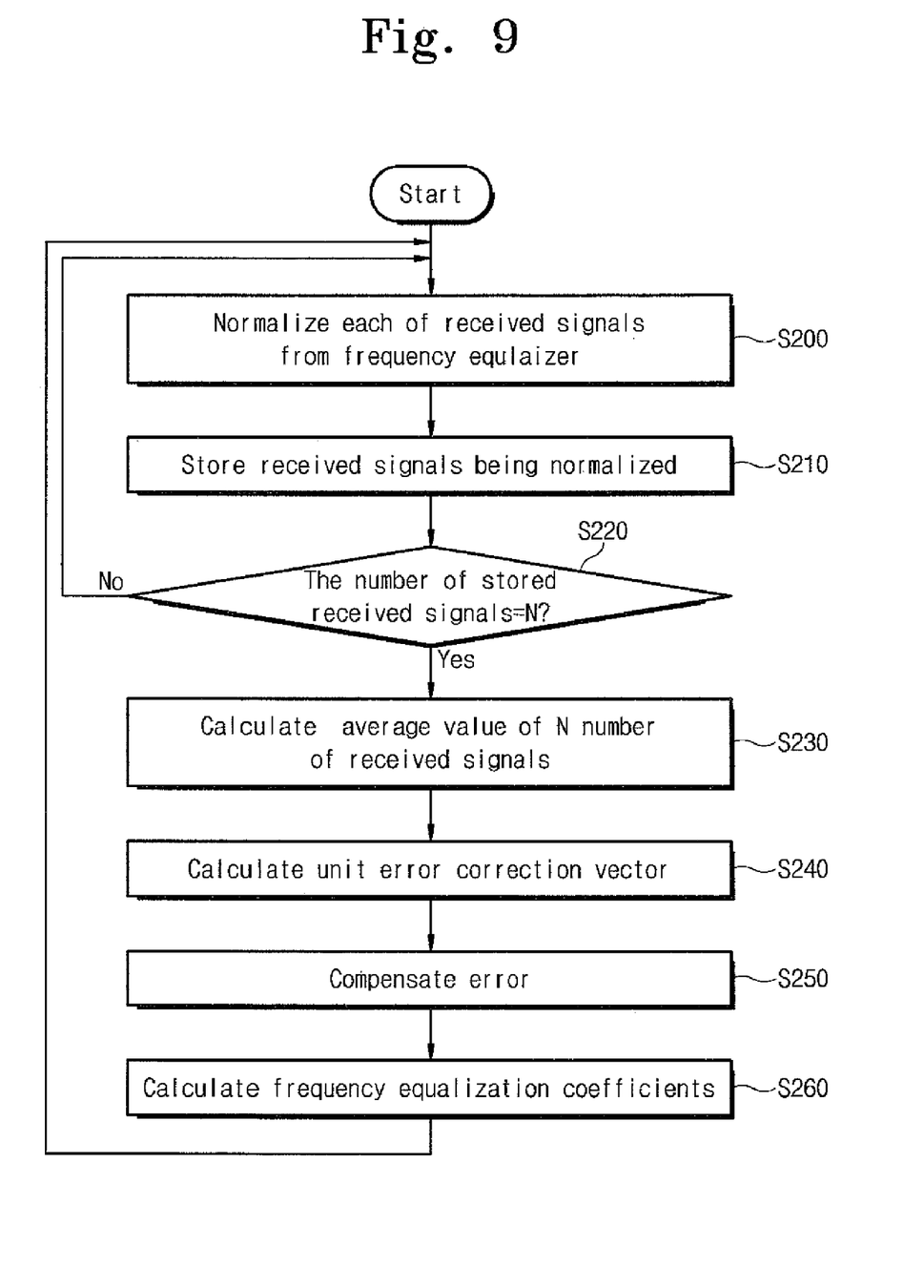
FIG. 9 is a flowchart depicting sequential operations in a method of calculating (and updating) a frequency equalization coefficient vector in accordance with the preferred embodiment of the invention.

FIG. 9 is a flowchart showing sequential operations of a method of calculating a frequency equalization coefficient vector in accordance with the preferred embodiment of the invention.

In step S200, the QAM normalizer 171 (see FIG. 1) receives signals (R=R1, R2, ..., RI), from the frequency equalizer 140 and then normalizes each sub-carrier to a reference coordinate value.

During an initialization interval, the multi sub-carrier communication system transmits/receives a signal at an assigned position of a coordinate plane defined by the protocol of the multi sub-carrier communication system. However, when accurate channel estimation cannot be accomplished within a predetermined period, accurate calculation of the frequency equalization coefficient vector cannot be achieved. Also, a signal received during the data receiving interval has a certain coordinate value and thus, it is impossible to calculate an error between the reference signal REF and the received signal R. In accordance with the preferred embodiment of the invention, the received signal R positioned at the certain coordinate is normalized to the reference signal REF so as to calculate the unit error correction vector U. Based on the calculated unit error correction vector U, the updated FEQ coefficient vector is calculated.

Figure 5:
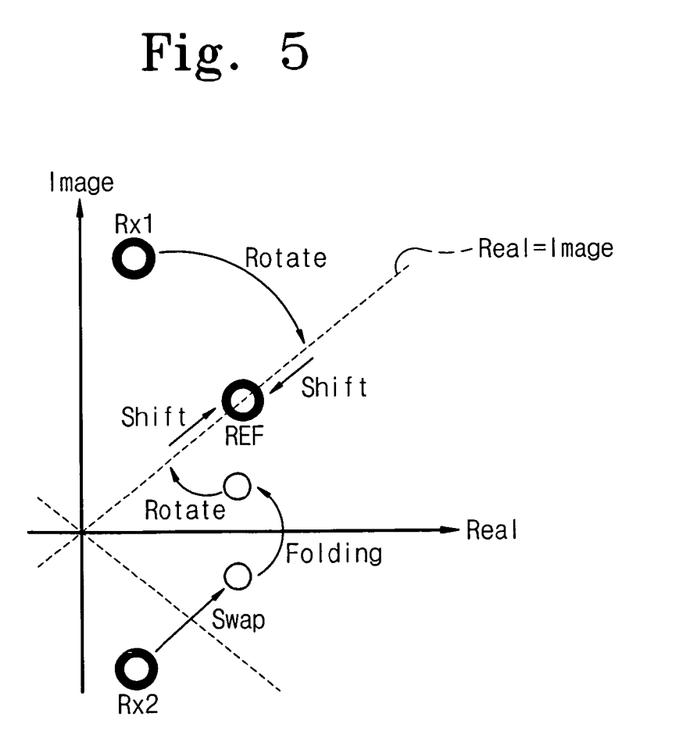
FIG. 5 is a graph depicting a methodology for normalization of a received signal in accordance with a preferred embodiment of the invention.

FIG. 5 is a graph conceptually showing a normalization procedure of a received signal.

As shown in FIG. 5, if the coordinates (a+bj) of a received signal (e.g., R×1) satisfy the condition (a*b)>0, then the coordinates of the received signal (R×1) are rotated such that the coordinates (a+bj) of the received signal (R×1) are correspondingly transformed to an axis where the real coordinate and the imaginary coordinate become equal and then, the transformed coordinate is shifted to a reference coordinate. For example, the reference coordinate is (1+1j).

If the coordinates (a+bj) of a received signal (e.g., R×2) satisfy the condition (a*b)>0, then the real part of the received signal (R×2) is swapped with its imaginary part. If the real part is less than 0, i.e., a<0, the coordinates (a+bj) of the received signal (R×2) are folded over the real axis. If the imaginary part is less than 0, i.e., b<0, the coordinates (a+bj) of the received signal (R×2) is folded over the imaginary axis. The folded coordinates are rotated such that the folded coordinates are correspondingly transformed to the axis where the real coordinate equals the imaginary coordinate and then, the transformed coordinates are shifted to the reference coordinate.

Figure 6:
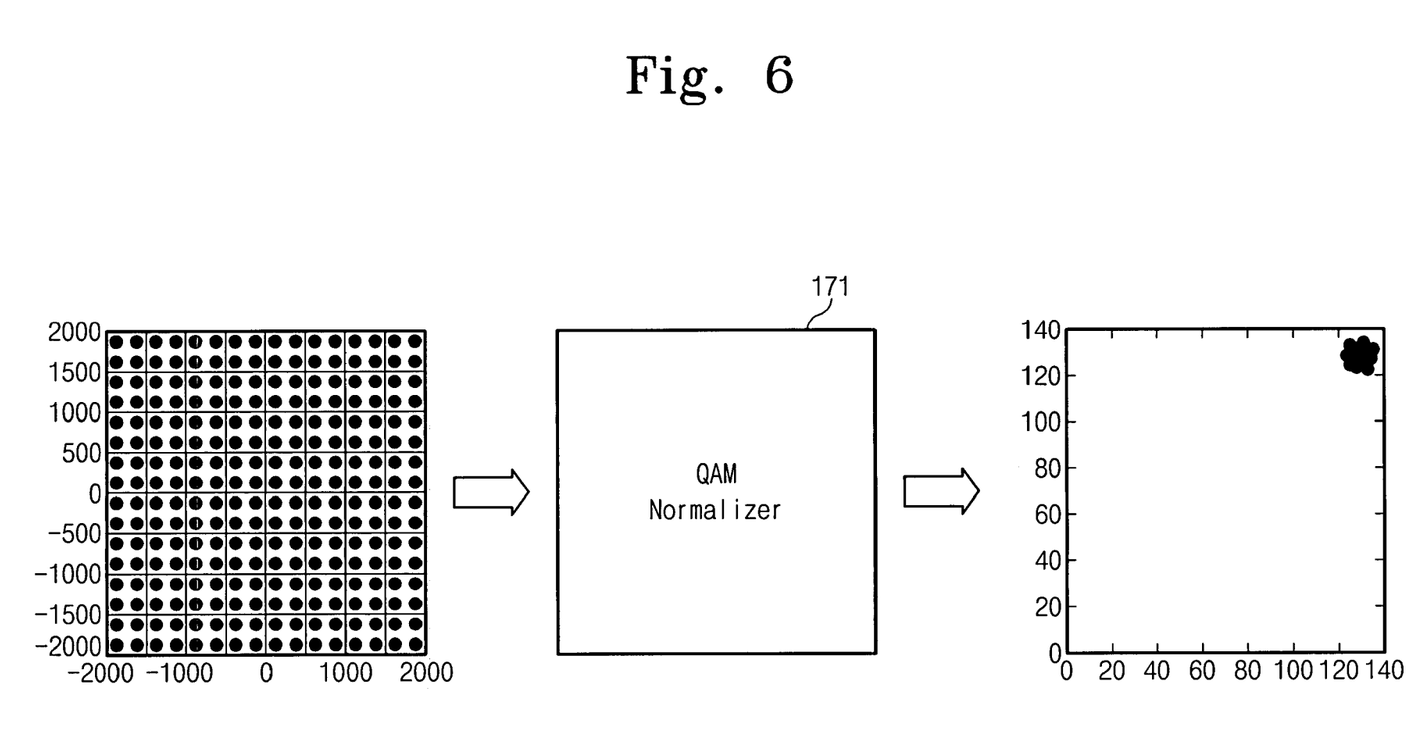
FIG. 6 is a diagram depicting an exemplary normalization based on a quadrature amplitude modulation (QAM) when a data having an actual size of approximately 256 is received in a communication system in compliance with G.992.1 asymmetric digital subscriber line (ADSL) Annex A.

Thus, the received signal R is transformed to the reference coordinate by the QAM normalizer 171 (FIG. 1) as described above and as illustrated in FIG. 5. FIG. 6 shows an exemplary normalization of a received signal performed by the QAM normalizer 171 (FIG. 1) when a QAM data with the actual size of approximately 256 is received in a communication system following the standard of G.992.1 asymmetric digital subscriber line (ADSL) Annex A.

Ideally, the coordinate of the received signal R normalized by the QAM normalizer 171 is (1+1j). However, in an actual scenario, the received signal R is distributed around the coordinate of (1+1j) because of noise of the channel 10 (FIG. 2). If the reference signal REF is defined as the coordinate of (1+1j), the frequency equalization coefficient vector can be calculated based on the difference between the reference signal REF and the (normalized) received signal R.

With further reference to FIG. 9, the next operations of the frequency equalization coefficient calculation will be explained hereinafter.

At step S210, the received signals (Ri) normalized by the QAM normalizer 171 are stored into the buffer 172. And then, in step S220 when the number of the stored normalized received signals Ri in the buffer 171 (FIG. 1) reaches N, step S230 is next performed, otherwise steps S200 and S210 are repeated. In step S230, the unit error correction vector calculator 173 (FIG. 1) calculates an average value Ravg(i,n) of the received signals R. Next, in step S240, the unit error correction vector U(i,n) is calculated.

The unit error correction vector U(i,n) represents the difference between the coordinate of the reference signal and that of the received signal. The unit error correction vector is an indicator for indicating the accuracy level of a current frequency equalization coefficient vector. However, when the channel noise is high, or greater burst noise is generated, reliability of the unit error correction vector decreases. In consideration of this scenario, in step S250 the error compensator 174 reflects a predetermined compensation ratio on the calculated unit error correction vector U(i,n) to adjust the reliability of the calculated unit error correction vector U(i,n). As a result, it is possible to gradually decrease the error of the frequency equalization coefficient vector.

When the coordinates of the reference signal REF are not different from the coordinates of the received signal R, then the difference between the calculated unit error correction vector and the ideal vector, (i.e., U(i,n)−ideal), is (1+0*j). Thus, an error value E can be calculated based on the calculated unit error correction vector U(i,n) and the above mentioned difference of U(i,n)−ideal. Then, the calculated error value E is divided by a predetermined constant. The division result is applied to the calculated unit error correction vector of U(i,n) to provide a partially error-compensated unit error correction vector. Instead of applying the calculated unit error correction vector of U(i,n), the above partially error-compensated unit error correction vector is used for controlling the reliability of the unit error correction vector U(i,n). This operation is defined as the following equation 5:

$$\text{Real}(E(i, n)) = 1 - \text{Real}(U(i, n))$$
$$\text{Imag}(E(i, n)) = 0 - \text{Real}(U(i, n))$$
$$\text{Error-compensated } U = U(i, n) + \frac{E(i, n)}{K};$$
where $U(i, n)$ is uncompensated Equation 5 wherein, $K$ is a compensation ratio.

Figure 7:
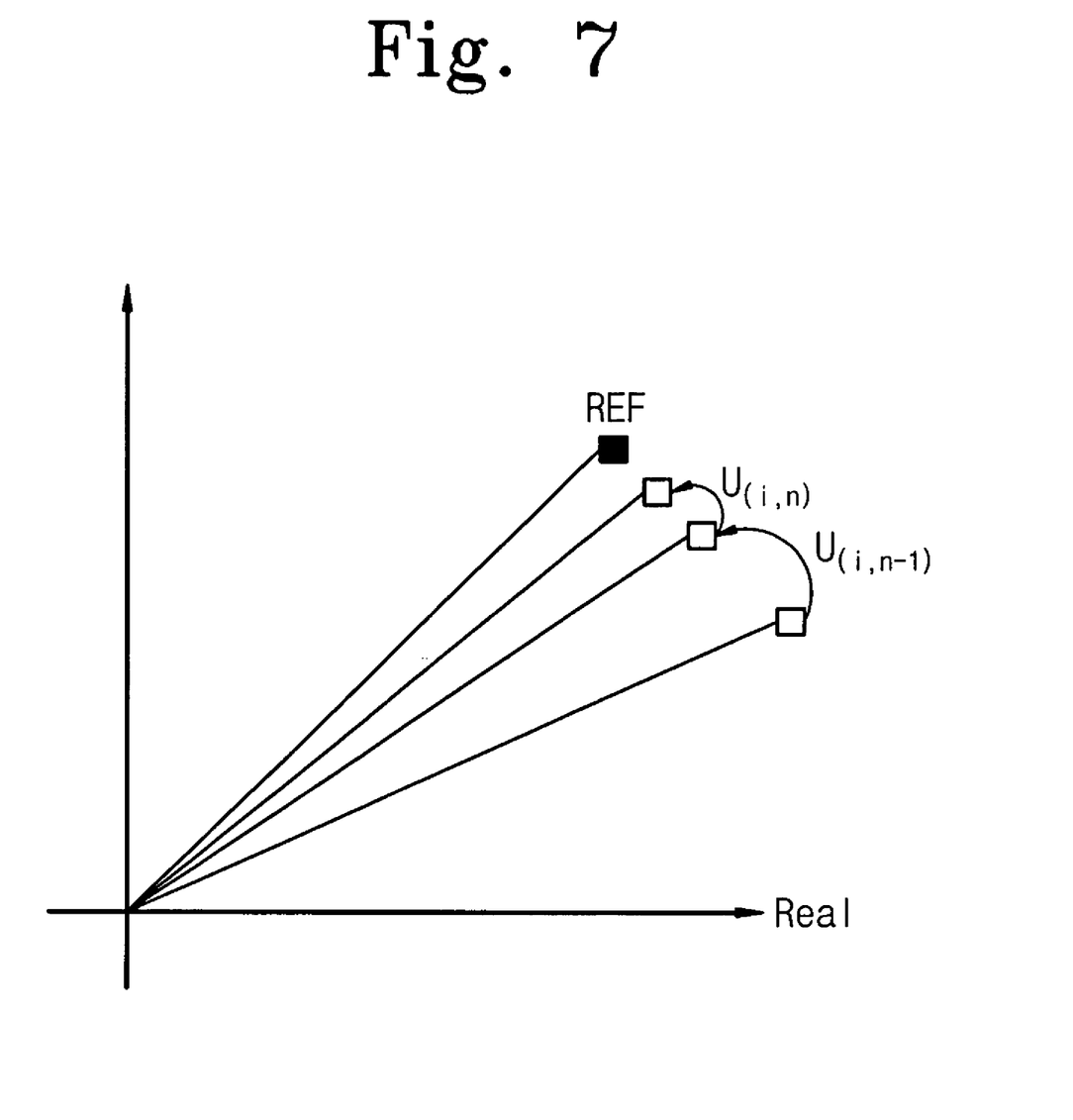
FIG. 7 is a graph depicting one example of a change in a unit error correction vector when an error compensation ratio K is 2.

FIG. 7 shows one exemplary case of adjusting the reliability of the unit error correction vector when the compensation ratio K is 2. For example, a compensation ratio K equal to 2 indicates that the reliability of the unit error correction vector is approximately 50%. According to FIG. 7, for each $N^{th}$ frame, the error of a frequency equalization coefficient decreases by approximately 50% relative to that of a precedent frequency equalization coefficient (e.g., defined in a prior update).

Referring to FIG. 1, the multiplier 176 (FIG. 1) multiplies the unit error correction vector that is subjected to the error-compensation operation by a precedent frequency equalization coefficient (F(i,n-1)) stored in the precedent frequency equalization coefficient buffer 175. In step S260 in FIG. 9, the new (updated) frequency equalization coefficient vector outputted from the multiplier 176 (FIG. 1) is provided to the frequency equalizer 140.

After the update of the frequency equalization coefficient vector outputted by the frequency equalizer 140, the operations defined in the aforementioned equations 1 to 5 are repeated with respect to the received signals R for N number of frames. When the unit error correction vector U(i,n) reaches a value of 1, it is assumed that the frequency equalization coefficient vector is optimum.

Figure 8:
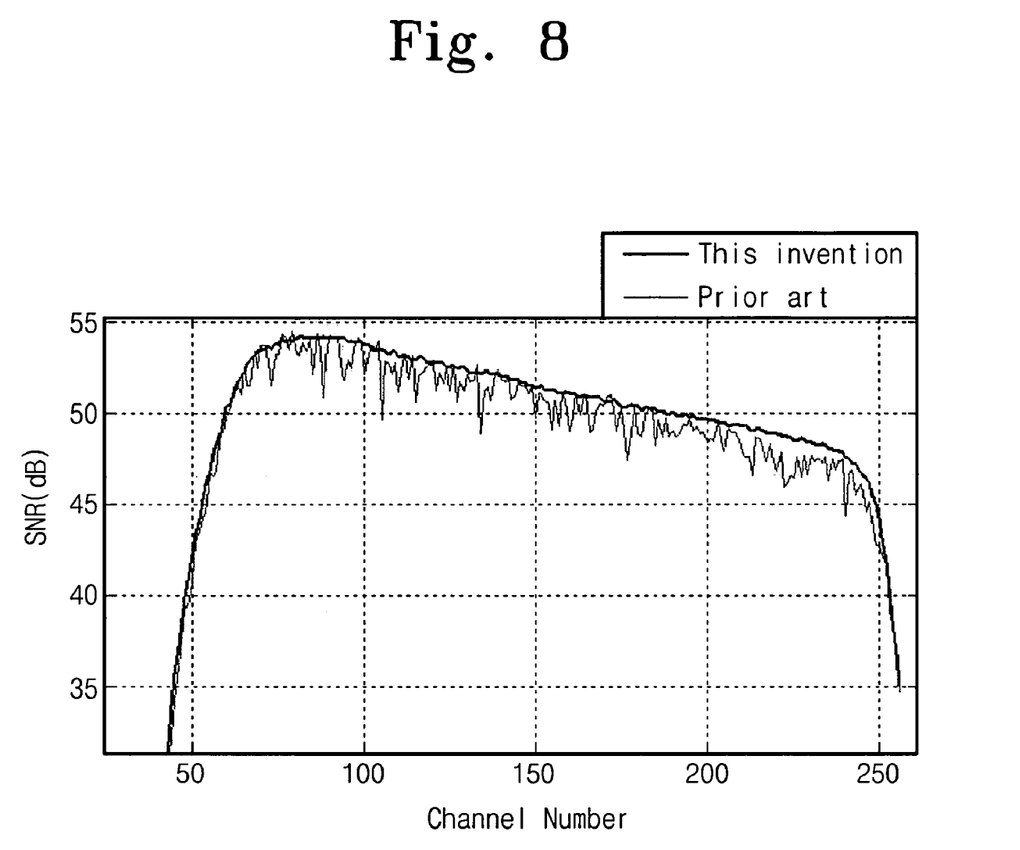
FIG. 8 is a graph depicting a signal-to-noise ratio (SNR) of a signal of a wire communication system in compliance with G.992.1 ADSL Annex A.

Performance of a receiver of a communication system can be estimated based on the signal to noise ratio (SNR) of a received signal. FIG. 8 is a graph showing a SNR ratio of a received signal in a wired communication system in compliance with G.922.1 ADSL Annex A.

In the graph shown in FIG. 8, a thin solid line represents the SNR ratio of a received signal in a conventional receiver without the frequency equalization coefficient calculation unit 170 of FIG. 1. On the other hand, a thick solid line represents a SNR ratio of a received signal in the receiver 100 of FIG. 1 according to the preferred embodiment of the invention. As for the conventional receiver, a frequency equalization coefficient is set only during an initialization interval but this same frequency equalization coefficient is used for the frequency equalization operation during the whole data receiving interval. Hence, when a channel characteristic changes over the passage of time, the signal-to-noise ratio (SNR) of the signal develops into a sawtooth shape.

By contrast, the receiver 100 in accordance with the preferred embodiment of the invention updates the frequency equalization vector coefficients after the initialization interval and periodically during the data receiving interval, thereby optimizing performance of the frequency equalizer 140. As a result of this optimized performance, the signal-to-noise ratio of the signal is a smooth curve over time.

According to an aspect of the preferred embodiment of the invention, the receiver of the multi sub-carrier communication system calculates and updates a frequency equalization coefficient vector periodically after an initialization interval for initially estimating a channel characteristic as well as subsequently during an entire data receiving interval. Therefore, it is possible to dynamically deal with changes of the channel characteristic over the passage of time so as to improve performance of the frequency equalizer. Accordingly, performance of the multi sub-carrier communication system can be enhanced.

It will be apparent to those skilled in the art that various modifications and variations can be made in the invention. Thus, it is intended that the invention covers the modifications and variations of this invention within the scope of the appended claims and their equivalents.

What is claimed is:

1. A method for calculating a frequency equalization coefficient vector of a frequency equalizer to correct a channel distortion of a received signal by using the frequency equalization coefficient vector, the method comprising the steps of:
   receiving for each frame a signal outputted from the frequency equalizer;
   normalizing each of the received signals with a predetermined coordinate value to a reference coordinate value;
   calculating an average value of N number of the normalized received signals at the N-th frame;
   calculating a unit error correction vector based on the average value;
   updating the frequency equalization coefficient vector with the calculated unit error correction vector, wherein each of the received signals is a signal encoded in quadrature amplitude modulation (QAM);
   wherein the step of normalizing each of the received signals includes the steps of:
      detecting the sign of a real number and the sign of an imaginary number of the received signal;
      swapping the real number and the imaginary number for each other when the real number sign is different from the imaginary number sign;
      rotating the coordinates of the received signal to an axis where the real number equals to the imaginary number; and
      shifting the rotated coordinate of the received signal to the reference coordinate value.

2. A multi sub-earner communication system, comprising:
   a frequency equalizer to use a frequency equalization vector to compensate for a channel distortion of each received signal outputted from a Fourier transformer; and
   a calculation unit for calculating the frequency equalization vector, wherein the calculation unit includes:
      a normalizer for normalizing each of the received signals from the frequency equalizer to a reference coordinate value;
      a buffer for storing the normalized received signals;
      a unit error correction vector calculator for calculating an average value of N number of the stored normalized received signals and calculating the unit error correction vector based on the average value;
      an error compensator for compensating the calculated unit error correction vector according to a predetermined compensation ratio; and
      a multiplier for updating the frequency equalization vector by multiplying the coefficients of a precedent frequency equalization vector with the corresponding coefficients of the compensated unit error correction vector wherein the normalizer detects the sign of a real number and the sign of an imaginary number of the received signal, swaps the real number and the imaginary number for each other when the real number sign is different from the imaginary number sign, rotates the coordinates of the received signal to an axis where the real number equals to the imaginary number, and shifts the rotated coordinate of the received signal to the reference coordinate value.

3. The multi sub-carrier communication system of claim 2, wherein the unit error correction vector represents a ratio of an expected received value to the calculated average value.

4. The multi sub-carrier communication system of claim 2, wherein the frequency equalization vector is updated when the calculation result of the multiplier is outputted.

5. The multi sub-carrier communication system of claim 3, further comprising:
   an analog-digital converter for converting a received analog signal inputted through the channel into a digital received signal;
   a serial-parallel converter for converting the digital received signal outputted from the analog-digital converter into a parallel signal; and
   a Fourier transformer for converting the parallel digital received signal within a time domain outputted from the serial-parallel converter into a frequency domain signals,
   wherein the frequency domain signals outputted from the Fourier transformer is provided as the received signal to the frequency equalizer.

6. The multi sub-carrier communication system of claim 5, wherein each of the received signals is a signal modulated in a QAM modulation.

7. The multi sub-carrier communication system of claim 6, wherein the expected value is the reference coordinate value.

8. The multi sub-carrier communication system of claim 7, wherein each of the received signals includes I number of sub-carriers.

9. The multi sub-carrier communication system of claim 8, wherein the normalizer normalizes each sub-carrier of the received signal to a reference coordinate value.

10. The multi sub-carrier communication system of claim 9, wherein the unit error correction vector calculator calculates an average value of the sub-carriers of each received signal and calculates the unit error correction vectors each being a ratio of the expected value to each of the average values.

11. The multi sub-carrier communication system of claim 10, wherein the error compensator error-compensates each of the calculated unit error correction vectors according to a predetermined error compensation ratio.

12. The multi sub-carrier communication system of claim 11, wherein the multiplier updates the frequency equalization coefficient corresponding to each of the I sub-carriers of the frequency equalizer by multiplying each coefficient of the unit error correction vector with a corresponding coefficient of a precedent frequency equalization vector.

13. A method for calculating a frequency equalization coefficient vector of a frequency equalizer to correct a channel distortion of a received signal by using the frequency equalization coefficient vector, the method comprising the steps of:
   receiving for each frame a signal outputted from the frequency equalizer;
   normalizing the received signal with a predetermined coordinate value to a reference coordinate value;
   calculating an average value of N number of the received signals at the N-th frame;
   calculating a unit error correction vector based on the average value; and
   updating the frequency equalization coefficient vector with the calculated unit error correction vector
   wherein the step of normalizing the received signal includes the steps of:
   detecting the sign of a real number and the sign of an imaginary number of the received signal;
   swapping the real number and the imaginary number for each other when the real number sign is different from the imaginary number sign;
   rotating the coordinates of the received signal to an axis where the real number equals to the imaginary number; and
   shifting the rotated coordinate of the received signal to the reference coordinate value.

* * * * *